(12) United States Patent
Annan et al.

(10) Patent No.: US 8,954,044 B1
(45) Date of Patent: *Feb. 10, 2015

(54) OFF-DEVICE SERVICE PLATFORM DISCOVERY

(71) Applicant: Sprint Communications Company, L.P., Overland Park, KS (US)

(72) Inventors: Brandon C. Annan, Westwood Hills, KS (US); Dhananjay Indurkar, Overland Park, KS (US); John M. Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/957,995

(22) Filed: Aug. 2, 2013

Related U.S. Application Data

(63) Continuation of application No. 12/482,262, filed on Jun. 10, 2009, now Pat. No. 8,526,924.

(51) Int. Cl.
*H04L 29/06* (2006.01)
*G06F 15/177* (2006.01)
*G06F 15/173* (2006.01)

(52) U.S. Cl.
CPC .................................... *H04L 29/06* (2013.01)
USPC ......................... 455/414.3; 709/222; 709/238

(58) Field of Classification Search
None
See application file for complete search history.

(56) References Cited

U.S. PATENT DOCUMENTS

2005/0193106 A1* 9/2005 Desai et al. .................... 709/223
2005/0288045 A1* 12/2005 Yang et al. .................... 455/466

* cited by examiner

*Primary Examiner* — Dwayne Bost
*Assistant Examiner* — Christopher Kohlman

(57) ABSTRACT

Many mobile devices can access websites on the Internet. A mobile device running a web server application can host websites and provide services. For a first mobile device to access services on a second mobile device, the first mobile device needs the IP address of the second mobile device. The first mobile device sends a connection request to the second mobile device. The first mobile device receives, from the second mobile device, the network address of the second mobile device, identification of services that are available on the second mobile device, and a security token. The first mobile device selects a service and sends an HTTP or HTTPS request for the service to the network address of the second mobile device, and also sends the security token. The second mobile device authenticates the request based on the token and allows the first mobile device to access the selected service.

19 Claims, 3 Drawing Sheets

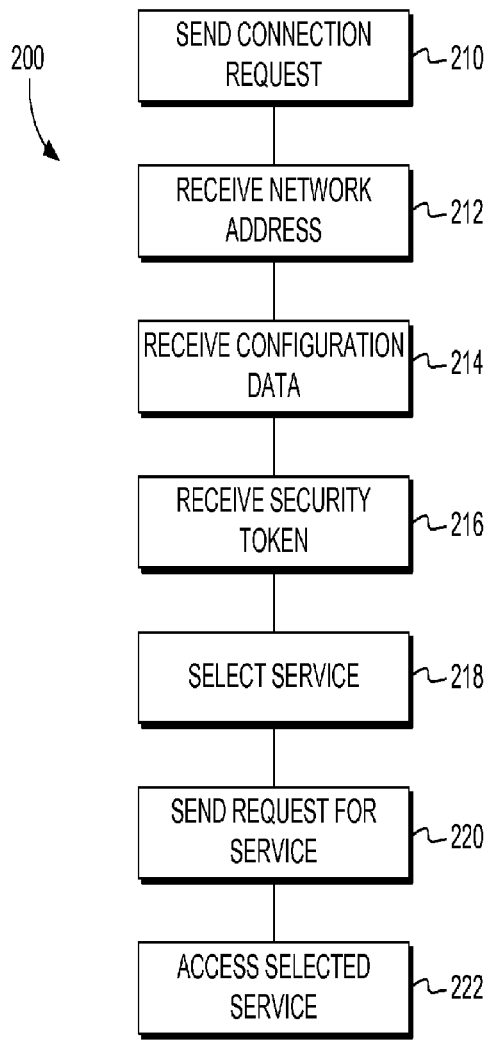
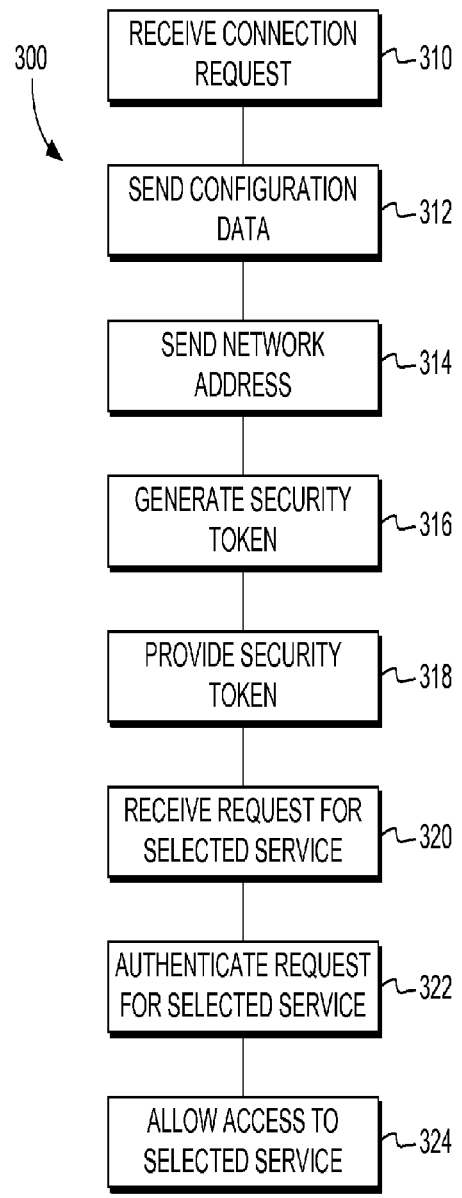
FIG. 2
FIG. 3

OFF-DEVICE SERVICE PLATFORM DISCOVERY

CROSS-REFERENCE TO RELATED APPLICATIONS

This application is a continuation of U.S. patent application Ser. No. 12/482,262, filed Jun. 10, 2009, entitled "Off-Device Service Platform Discovery," which is herein incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In one aspect, a set of computer-useable instructions embodied on computer-readable media is provided for performing a method of accessing, from a first mobile device, a service that resides on a second mobile device. The first mobile device sends a connection request to the second mobile device by way of a non-Internet-Protocol (non-IP) connection. The first mobile device receives, from the second mobile device, an IP address of the second mobile device and an identification of one or more services that reside on the second mobile device. A security token associated with the second mobile device is received. A request is sent for a service selected from the one or more services, where the request for the selected service includes the security token, and the request for the selected service is sent to the IP address of the second mobile device.

In another aspect, a set of computer-useable instructions embodied on computer-readable media is provided for performing a method of accessing, from a first mobile device, a service that resides on a second mobile device. The first mobile device sends a connection request to the second mobile device by way of a non-Internet-Protocol (non-IP) connection. The first mobile device receives, from the second mobile device, an IP address of the second mobile device and an identification of one or more services that reside on the second mobile device. A security token associated with the second mobile device is retrieved from a server. A request is sent for a service selected from the one or more services, where the request for the selected service is sent to the IP address of the second mobile device. The security token is also sent to the IP address of the second mobile device.

BRIEF DESCRIPTION OF THE SEVERAL VIEWS OF THE DRAWINGS

Illustrative embodiments of the present invention are described in detail below with reference to the attached drawing figures, and wherein:

FIG. 2 depicts a method suitable for use in accordance with an embodiment of the present invention;

FIG. 3 depicts a method suitable for use in accordance with an embodiment of the present invention.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

BSC Base Station Controller
GPS Global Positioning System
HTTP Hypertext Transfer Protocol
HTTPS Hypertext Transfer Protocol Secure
IP Internet Protocol
LAN Local Area Network
NAI Network Access Identifier
PAN Personal Area Network
PDA Personal Digital Assistant
PSTN Public Switched Telephone Network
USB Universal Serial Bus Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
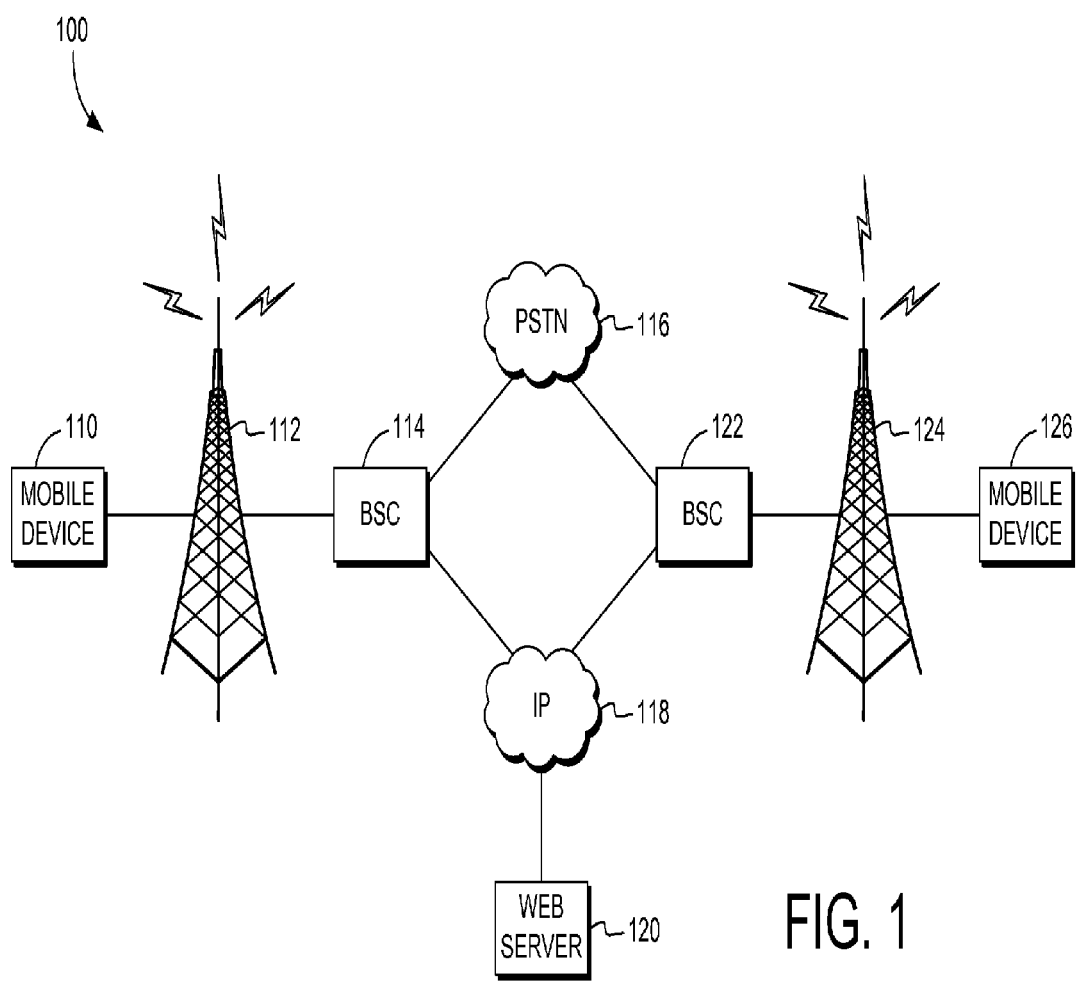
FIG. 1 depicts a network suitable for use in accordance with an embodiment of the present invention.

A mobile device, such as a cell phone or a personal digital assistant (PDA), may have the ability to access a website via the Internet. Essentially, a web browser application runs on the mobile device and renders a user interface, displays website content, and accesses services provided by the website. The website resides on, or is hosted by, a web server. FIG. 1 is a block diagram depicting an overview of a network suitable for use in accordance with an embodiment of the present invention and is generally referred to as a network 100. Network 100 is but one example of a suitable network and is not intended to suggest any limitation as to scope of use or functionality. Neither should network 100 be interpreted as having any dependency or requirement relating to any one or combination of components or modules illustrated.

FIG. 1 depicts a mobile device 110, a cell tower 112, a base station controller (BSC) 114, a public switched telephone network (PSTN) 116, an Internet protocol (IP) network 118, a web server 120, a BSC 122, a cell tower 124 and a mobile device 126.

An exemplary mobile device 110 includes a cell phone. Other exemplary mobile devices include a PDA and any mobile device capable of connecting with network 100 and accessing a website. Mobile device 110 communicates with BSC 114 by way of cell tower 112 that is associated with BSC 114. BSC 114 determines whether the communication from mobile device 110 should be routed to PSTN 116 or to IP network 118. For example, when a user of mobile device 110 places a phone call to mobile device 126, the communication from mobile device 110 is routed through PSTN 116, to BCS 122, and transmitted by cell tower 124 to mobile device 126. Alternately, when a user of mobile device 110 accesses a website hosted by web server 120, the communication is routed through IP network 118 to web server 120.

In embodiments of the invention, a web server application resides on mobile device 126, such that mobile device 126 may host a website that is accessible to other devices on network 100. Additionally, mobile device 126 may have services residing on it that can be provided to other devices on network 100 by the web server, just as a typical web server might provide services to other devices. For example, mobile device 126 may have various applications and built-in capabilities that provide a variety of services to a user of mobile device 126, such as Internet access, email, text messaging, gaming, Bluetooth connectivity, a camera, video recorder, MMS for sending and receiving photos and video, MP3 player, radio, GPS, as well as others. Not all mobile devices provide the same services, although it is very common for a mobile device to have Internet access. Embodiments of the invention enable a mobile device, having Internet access, to access services that reside on another mobile device, similar to the way a mobile device accesses services that reside on a typical web server.

A web server application running on mobile device 126 has access to features on mobile device 126, such as the user's stored music and video, GPS, contacts, as well as other features. Mobile device 110, having Internet access, can access the features of mobile device 126 by establishing a web connection with the web server application on mobile device 126. Thus, the user of mobile device 110 may download or stream music and videos stored on mobile device 126, and may similarly access the other services on mobile device 126.

An exemplary service includes streaming video. For example, a user of mobile device 126 may use a video camera feature of mobile device 126 to capture video that is subsequently stored on mobile device 126. Or, a video may be downloaded or otherwise stored on mobile device 126. The web server application residing on mobile device 126 may have the ability to stream the stored video to another device over network 100. Any device capable of accessing a web server, e.g. a device running a web browser application, may access mobile device 126 and receive the streamed video from mobile device 126 over an HTTP or HTTPS connection, if the device knows the IP address of mobile device 126. Embodiments of the invention enable mobile device 110 to discover the IP address of mobile device 126 by initially communicating over a non-IP connection with mobile device 126.

In another embodiment, a television network may establish web connections with multiple mobile devices 126 belonging to users attending a baseball game. For example, there may be 500 people in the stands who have mobile devices 126, and can provide a streaming camcorder service and a GPS service. The television network covers the game using its static camera positions, and is also able to receive live streaming video of the game from each of the 500 mobile devices 126, each having a different view of the game. The television network can also access the GPS service on each of the mobile devices 126 devices to show where in the stadium that mobile device is located. In an embodiment, the initial communication prior to establishing a web connection may take place over a wireless LAN provided by the stadium.

In another embodiment, mobile device 126 is a bar code scanner used in a warehouse to scan and store inventory barcodes as inventory enters and leaves the warehouse. The web server application that runs on mobile device 126 provides a variety of services such as transferring to another device one day's worth of scans or transferring a culmination of a single bar code scanned over multiple days. Mobile device 110 is a data collection device that gathers data from one or more mobile devices 126 and processes the data or sends it to a central data center in order to track the warehouse inventory.

The data collection device (i.e. mobile device 110) establishes an IP connection with the bar code scanner (i.e. mobile device 126) and accesses a data transfer service. In embodiments, the initial communication prior to establishing a web connection may take place over a PAN or even by way of a physical electrical connection, such as with a docking station or a USB cable.

More generally, in embodiments of the invention, if a user of mobile device 110 wants to access a service that resides on mobile device 126, then mobile device 110 must acquire the network address, or IP address, of mobile device 126. However, mobile device 126 does not have a fixed IP address; rather, an IP address is assigned to mobile device 126 when the device registers with network 100. As mentioned above, embodiments of the invention enable mobile device 110 to discover the IP address of mobile device 126.

In embodiments of the invention, in order to discover the IP address of mobile device 126, mobile device 110 initially communicates with mobile device 126 using non-web-based communication. For example, each mobile device may be uniquely identified by either or both a phone number and a network access identifier (NAI). Mobile device 110 may send data to mobile device 126 by using the phone number of mobile device 126. Alternately, data may be sent using the NAI of mobile device 126. It is also contemplated herein that communication between mobile devices 110 and 126 may occur using other technologies including, but not limited to, short-range communications such as a wireless local area network (LAN) and a personal area network (PAN).

Referring now to FIG. 2, a flowchart depicts a method suitable for use in accordance with an embodiment of the present invention and is generally referred to as method 200. Method 200 is but one example of a suitable method and is not intended to suggest any limitation as to scope of use or functionality. Neither should method 200 be interpreted as having any dependency or requirement relating to any one or combination of components or modules illustrated.

At a step 210, mobile device 110 sends a connection request to mobile device 126. The connection request identifies mobile device 110 and indicates to mobile device 126 that mobile device 110 wishes to obtain the IP address of mobile device 210. The connection request may be sent by any technology available to mobile device 110. For example, as discussed above, mobile device 110 may send the connection request through the network using the phone number of mobile device 126. Alternately, if both mobile device 110 and mobile 126 have wireless LAN capability and a wireless LAN is available, then the connection request may be sent using the wireless LAN. It is also contemplated herein that a physical electrical connection between two mobile devices, such as a universal serial bus (USB), may be used to send the connection request. Unlike web access, which requires a communication protocol such as HTTP or HTTPS, the connection request is protocol agnostic, i.e., it does not require a particular protocol. It only requires that the two mobile devices use the same protocol.

At a step 212, mobile device 110 receives, from mobile device 126, the network address (IP address), including port assignments, of mobile device 126 in response to the connection request. The network address is required in order to initiate an HTTP or HTTPS session with mobile device 126.

At a step 214, mobile device 110 receives configuration data from mobile device 126. The configuration data includes the capabilities of mobile device 126, such as a GPS receiver, a video camera, etc. The configuration data also includes an identification or description of available services that reside on mobile device 126.

At a step 216, mobile device 110 receives a unique security token that was generated by mobile device 126 in response to the connection request. The security token enables mobile device 126 to authenticate a request for a service that is received from mobile device 110. In embodiments of the invention, mobile device 126 may send the security token to mobile device 110. In other embodiments, mobile device 126 may send the security token to an intermediate location such as a third-party server that provides the security token to mobile device 110. An exemplary third-party server includes an authentication server that is accessible to mobile device 110.

At a step 218, mobile device 110 selects a service from among the identified services that are available on mobile device 126. In embodiments of the invention, the selection of a service by mobile device 110 may be based on user input, such as when mobile device 110 is a cell phone or a PDA. In other embodiments, the selection may be automatic, based on inherent or predetermined functions of mobile device 110 and mobile device 126. For example, mobile device 126 may be a barcode scanner that hosts a web server application. The web server application provides only the service of communicating barcode data that has been collected by mobile device 126. Mobile device 110 may be a data collection device that collects the barcode data from mobile device 126. In that case, mobile device 110 is predetermined to select that service.

At a step 220, mobile device 110 sends an HTTP or HTTPS request for the selected service to the network address of mobile device 126 to initiate a connection with the web server application that resides on mobile device 126. The request includes the security token that was received by mobile device 110. The presence of the security token with the request enables mobile device 126 to authenticate the request by comparing the token with the security token that was originally provided to mobile device 110. Once the request has been authenticated, mobile device 126 permits an HTTP or HTTPS session to be established, and mobile device 110 is permitted to access the selected service by communicating with the web server application.

At a step 222, mobile device 110 accesses the selected service on mobile device 126. A web browser application that resides on mobile device 110 provides data required by the service and receives data that is provided by the service. Exemplary data provided by the service includes location data from a GPS receiver and video data from a streaming video service. The data received from the selected service may be rendered by the web browser application and displayed to the user, or may be used as input to another application or function on mobile device 110.

Referring now to FIG. 3, a flowchart depicts a method suitable for use in accordance with an embodiment of the present invention and is generally referred to as method 300. Method 300 is but one example of a suitable method and is not intended to suggest any limitation as to scope of use or functionality. Neither should method 300 be interpreted as having any dependency or requirement relating to any one or combination of components or modules illustrated.

Whereas method 200 is directed toward a mobile device that accesses services on another mobile device, method 300 is directed toward a mobile device that allows its services to be accessed by another mobile device. At a step 310, mobile device 126 receives a connection request from mobile device 110. The connection request is not received via an IP connection because mobile device 110 does not yet know the IP address of mobile device 126. As discussed above, the connection request may be received by way of the phone number or NAI of mobile device 126, or by any technology that enables mobile device 126 to communicate with mobile device 110.

At a step 312, mobile device 126 sends its configuration data to mobile device 110. The configuration data includes an identification of the services residing on mobile device 126 that are available to be accessed by mobile device 110.

At a step 314, mobile device 126 sends its network IP address, including its port assignments, to mobile device 110. The IP address enables mobile device 110 to initiate a web connection with mobile device 126, by which mobile device 110 will be able to access the services available on mobile device 126.

At a step 316, mobile device 126 generates a security token that allows a request for a service to be authenticated. The security token is provided to mobile device 110 at a step 318. The security token may be provided by sending it to mobile device 110, or by way of posting it on an intermediary or third-party server, from where it may be retrieved by mobile device 110.

At a step 320, mobile device 126 receives a request from mobile device 110 for a service that was selected by mobile device 110 from among the available services identified in the configuration data. The request for the selected service also includes the security token that was provided to mobile device 110. The request, received at the network address of mobile device 126, may be formatted as an HTTP or HTTPS request and is processed by the web server application that resides on mobile device 126.

At a step 322, mobile device 126 authenticates the request for the selected service by comparing the security token included in the request with the security token that was provided to mobile device 110. If the security tokens match, then the request is authenticated.

At a step 324, based on the authentication of the request for the selected service, mobile device 126 allows mobile device 110 to access the selected service. The web browser application that resides in mobile device 110 then communicates with the web server application that resides in mobile device 126 and receives data provided by the selected service.

Figure 4:
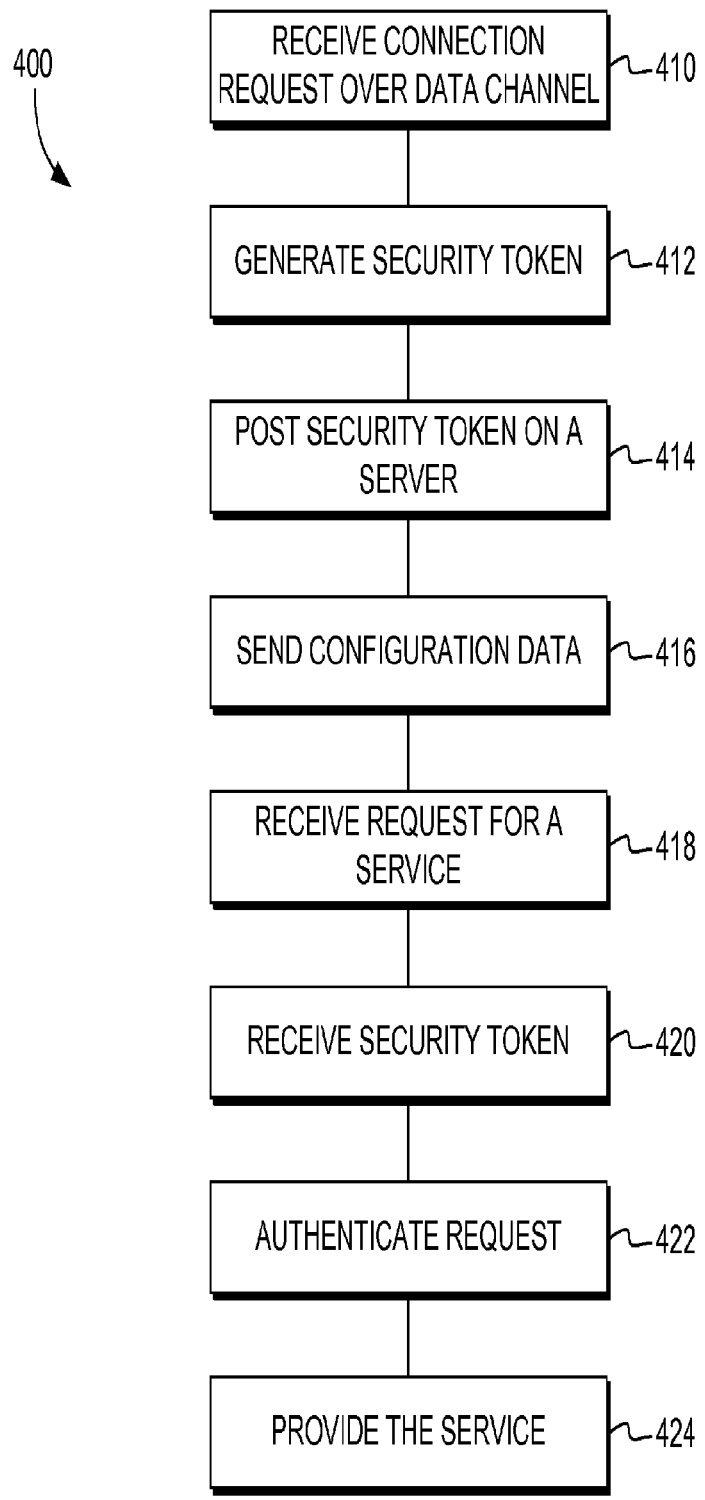
FIG. 4 depicts a method suitable for use in accordance with an embodiment of the present invention.

Referring now to FIG. 4, a flowchart depicts a method suitable for use in accordance with an embodiment of the present invention and is generally referred to as method 400. Method 400 is but one example of a suitable method and is not intended to suggest any limitation as to scope of use or functionality. Neither should method 400 be interpreted as having any dependency or requirement relating to any one or combination of components or modules illustrated.

Method 400 is directed toward a mobile device that provides a service to another mobile device over a network session. At a step 410, mobile device 126 receives a connection request over a data channel from mobile device 110. Because mobile device 110 does not know the network address of mobile device 126, the connection request is sent using a technology other than an IP connection as discussed above.

At a step 412, mobile device 126 generates a unique security token that will be used to authenticate a request for a service from mobile device 110.

At a step 414, mobile device 126 posts the security token on a server such that the token can be retrieved from the server by mobile device 110.

At a step 416, mobile device 126 sends configuration data to mobile device 110 that includes an identification of a network address of mobile device 126 and an identification of available services that reside on mobile device 126. At this point, mobile device 110 has the network address of mobile device 126 and can initiate the network session. Mobile device 110 retrieves the security token from the server, selects a service from among the services identified by the configuration data, and sends a request for the service to the network address of mobile device 126. The request may be sent as an HTTP or HTTPS request. Mobile device 110 also sends the security token to the network address of mobile device 126.

At a step 418, mobile device 126 receives the request for the service at its network address. The request for the service is processed by the web server application that resides on mobile device 126. A web server application typically communicates with a web browser application using HTTP or HTTPS protocols, and communicates data that can be rendered by the web browser application.

At a step 420, mobile device 126 receives the security token at its network address.

At a step 422, mobile device 126 authenticates the request based on the security token, and allows the network session to be established.

At a step 424, based on the authentication of the request, mobile device 126 provides the selected service to mobile device 110 over the network session. The web browser application residing on mobile device 110 accesses the service by communicating with the web server application that resides on mobile device 126. Data generated or provided by the service is sent to mobile device 110 over the network session and is formatted in a protocol such as HTTP or HTTPS that is compatible with the web browser application that resides on mobile device 126.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative ways of implementing the aforementioned can be completed without departing from the scope of the claims below. Certain features and subcombinations are of utility and may be employed without reference to other features and subcombinations and are contemplated within the scope of the claims.

The invention claimed is:

1. One or more nontransitory computer-readable media having computer-executable instructions embodied thereon for performing a method of accessing, from a first mobile device, a service that resides on a second mobile device, the method comprising:

sending a connection request from the first mobile device to the second mobile device, wherein the connection request is sent by way of a non-Internet-Protocol (non-IP) connection;

receiving, from the second mobile device, an IP address of the second mobile device and an identification of one or more services that reside on the second mobile device;

receiving a security token associated with the second mobile device; and sending a request for a service selected from the one or more services, wherein the request for the selected service includes the security token, and wherein the request for the selected service is sent to the IP address of the second mobile device.

2. The media of claim 1, wherein the security token is received from a server, the security token having been provided to the server by the second mobile device.

3. The media of claim 2, wherein accessing the selected service includes receiving data provided by the selected service.

4. The media of claim 3, wherein receiving the IP address includes receiving a port assignment.

5. The media of claim 4, wherein the request for the selected service is one of an HTTP request and an HTTPS request.

6. The media of claim 5, wherein accessing the selected service includes communicating with a web server application that resides on the second mobile device.

7. The media of claim 6, wherein the data provided by the selected service is rendered by a web browser that resides on the first mobile device.

8. The media of claim 7, wherein the connection request is sent using a phone number associated with the second mobile device.

9. The media of claim 7, wherein the connection request is sent using a network access identifier associated with the second mobile device.

10. The media of claim 1, wherein the connection request is sent using a phone number associated with the second mobile device.

11. The media of claim 1, wherein the connection request is sent using a network access identifier associated with the second mobile device.

12. One or more nontransitory computer-readable media having computer-executable instructions embodied thereon for performing a method of accessing, from a first mobile device, a service that resides on a second mobile device, the method comprising:

sending a connection request from the first mobile device to the second mobile device, wherein the connection request is sent by way of a non-Internet-Protocol (non-IP) connection;

receiving, from the second mobile device, an IP address of the second mobile device and an identification of one or more services that reside on the second mobile device;

retrieving from a server a security token associated with the second mobile device;

sending a request for a service selected from the one or more services, wherein the request for the selected service is sent to the IP address of the second mobile device; and sending the security token to the IP address of the second mobile device.

13. The media of claim 12, wherein accessing the selected service includes receiving data provided by the selected service.

14. The media of claim 13, wherein the data provided by the selected service is rendered by a web browser that resides on the first mobile device.

15. The media of claim 12, wherein receiving the IP address includes receiving a port assignment.

16. The media of claim 12, wherein the request for the service is one of an HTTP request and an HTTPS request.

17. The media of claim 12, wherein accessing the selected service includes communicating with a web server application that resides on the second mobile device.

18. The media of claim 12, wherein the connection request is sent using a phone number associated with the second mobile device.

19. The media of claim 12, wherein the connection request is sent using a network access identifier associated with the second mobile device.

* * * * *